US011986765B2

(12) United States Patent
Saccani et al.

(10) Patent No.: US 11,986,765 B2
(45) Date of Patent: May 21, 2024

(54) METHOD AND APPARATUS FOR SEPARATING PARTICULATE COMPOSITION CARRIED BY A GASEOUS STREAM

(71) Applicant: ALMA MATER STUDIORUM—UNIVERSITA' DI BOLOGNA, Bologna (IT)

(72) Inventors: Cesare Saccani, Bologna (IT); Augusto Bianchini, Bologna (IT)

(73) Assignee: Alma Mater Studiorum—Universita' di Bologna, Bologna (IT)

( * ) Notice: Subject to any disclaimer, the term of this patent is extended or adjusted under 35 U.S.C. 154(b) by 112 days.

(21) Appl. No.: 17/046,741

(22) PCT Filed: Mar. 25, 2019

(86) PCT No.: PCT/IT2019/050064
§ 371 (c)(1),
(2) Date: Oct. 9, 2020

(87) PCT Pub. No.: WO2019/198113
PCT Pub. Date: Oct. 17, 2019

(65) Prior Publication Data
US 2021/0146293 A1    May 20, 2021

(30) Foreign Application Priority Data
Apr. 11, 2018  (IT) .................. 102018000004399

(51) Int. Cl.
*B01D 47/06* (2006.01)
*B01D 47/05* (2006.01)
(Continued)

(52) U.S. Cl.
CPC ............. *B01D 47/06* (2013.01); *B01D 47/05* (2013.01); *B05B 1/02* (2013.01); *B05B 1/34* (2013.01);
(Continued)

(58) Field of Classification Search
CPC .... B01D 47/06; B01D 47/05; B01D 2247/08; B05B 1/02; B05B 1/34; F23J 15/04; F23J 2217/50; F23J 2219/40; F23J 2219/70
See application file for complete search history.

(56) References Cited

U.S. PATENT DOCUMENTS 3,395,510 A * 8/1968 Barnes .................. B01D 3/166
                                                        95/18
3,505,788 A    4/1970 Teller et al.
(Continued)

OTHER PUBLICATIONS

International Search Report and Written Opinion of the International Searching Authority for International Application No. PCT/IT2019/050064, dated Sep. 20, 2019, in 14 pages.
(Continued)

*Primary Examiner* — Christopher P Jones
*Assistant Examiner* — Phillip Y Shao
(74) *Attorney, Agent, or Firm* — Knobbe Martens Olson & Bear LLP

(57) ABSTRACT

The present invention relates to a method and to an apparatus for separating an exhaust gas, in particular an exhaust gas of a boiler, comprising introducing a gas stream of exhaust gas inside a washing chamber, dispensing a pressurized liquid shaped as drops inside the washing chamber, wherein the delivery pressure is adjusted according to the specific particulate to be separated so as to provide, during the separating step, a physical interaction between the delivered liquid drops and the particulate particles.

5 Claims, 1 Drawing Sheet

(51) Int. Cl.
  *B05B 1/02* (2006.01)
  *B05B 1/34* (2006.01)
  *F23J 15/04* (2006.01)
(52) U.S. Cl.
  CPC ............ *F23J 15/04* (2013.01); *F23J 2217/50* (2013.01); *F23J 2219/40* (2013.01); *F23J 2219/70* (2013.01)

(56) References Cited

U.S. PATENT DOCUMENTS

| | | | | |
|---|---|---|---|---|
| 3,852,409 A | * | 12/1974 | Martin | ................... B01D 47/06 423/243.08 |
| 3,907,526 A | * | 9/1975 | Saleem | ................... B01D 47/06 423/243.01 |
| 3,989,488 A | * | 11/1976 | Wisting | ................. B01D 47/12 96/416 |
| 4,067,703 A | | 1/1978 | Dullien et al. | |
| 4,374,813 A | * | 2/1983 | Chen | ..................... B01D 47/06 423/243.08 |
| 4,375,976 A | * | 3/1983 | Potter | ................... B01D 50/10 95/200 |
| 4,437,867 A | | 3/1984 | Lerner | |
| 4,986,838 A | * | 1/1991 | Johnsgard | ............. B01D 47/06 96/368 |
| 6,322,617 B1 | * | 11/2001 | Wurz | ................... B05B 1/3421 95/219 |
| 2003/0066421 A1 | * | 4/2003 | Ku | ........................ B05B 15/525 95/149 |
| 2003/0089240 A1 | | 5/2003 | Price et al. | |
| 2012/0037003 A1 | | 2/2012 | Johnsgard et al. | |
| 2015/0101485 A1 | * | 4/2015 | Laslo | .................... B01D 47/06 261/78.2 |

OTHER PUBLICATIONS

Italian Search Report and Written Opinion issued in Italian Patent Application No. 102018000004399, dated Dec. 12, 2018, in 9 pages.

Fan et al., "Experimental investigation on removal of coal-fired fine particles by a condensation scrubber," Chemical Engineering and Processing: Process Intensification, Elsevier Sequoia, Lausanne, Switzerland, vol. 48, No. 8, pp. 1353-1360, Aug. 1, 2009.

* cited by examiner

Sec. A-A

METHOD AND APPARATUS FOR SEPARATING PARTICULATE COMPOSITION CARRIED BY A GASEOUS STREAM

CROSS-REFERENCE TO RELATED APPLICATIONS

This application is the U.S. National Phase under 35 U.S.C. § 371 of International Application No. PCT/IT2019/050064, filed Mar. 25, 2019, titled METHOD AND APPARATUS FOR SEPARATING PARTICULATE COMPOSITION CARRIED BY A GASEOUS STREAM, which claims priority to IT Patent Application No. 102018000004399, filed Apr. 11, 2018, the entirety of each of which is hereby expressly incorporated by reference herein.

TECHNICAL FIELD OF THE INVENTION

The present invention relates to a method and an apparatus for the separation of solid and/or liquid particulate, carried by a gaseous stream.

In particular, the invention relates to a method that involves the use of an apparatus operating as a wet separator.

The description below will be directed to the application of the separation apparatus to the fumes coming out from a biomass boiler, in particular of small dimensions, but it is well evident that the same should not be considered limited to this specific use since the application of the separation apparatus to boilers of medium and large dimensions is less problematic, both in terms of the efficiency of the apparatus and in terms of specific consumption.

STATE OF THE ART

Biomass boilers of small size (in particular boilers with powers lower than 35 kW) used in the residential sector, have found a considerable diffusion in the last decades as they determine both economic advantages (also due to the availability of low cost biomass) and environmental (the $CO_2$ balance is neutral for biomass).

Despite the widespread use, domestic boilers are still characterized by low combustion efficiency and are not optimally managed, thus causing high particulate emissions in the atmosphere that make them, potentially, one of the main causes of environmental pollution, due to the actual diffusion on the territory.

In particular, the mass concentration emitted by domestic biomass-fueled boilers typically is comprides between 200 mg and 350 mg per $Nm^3$ of exhaust gas generated by combustion. Furthermore, most of the powders emitted by boilers for residential use are PM 2.5 particulates.

In particular, over 95% of particles have a diameter of less than 1 µm.

In conditions of proper combustion, the typical particle size of the particulate in the fumes is given in mass percentage by:
- approximately 99% of PM 2.5 particulate (or particulate with a diameter less than or equal to 2.5 µm);
- about 0.5-0.75% of particulate is comprised between 2.5 µm and 10 µm;
- approximately 0.25-0.5% of the particulate is larger than 10 µm.

Usually, the dimensions of the particulate emitted by the combustion of the biomass are in a large percentage below 2.5 µm, but about the 95% is compred between 0.1 µm and 1 µm in diameter.

The particulate particle size distribution of the biomass is therefore quite varied.

This type of distribution makes filtration difficult because a plurality of capturing mechanisms are involved, but none of these, individually, acts optimally on the entire volume of the gas to be treated.

The characteristic size of the fine powder makes the installation of industrial filtration technologies not applicable, especially for small residential applications since, in order to obtain a sufficiently performing result in relation to the aforementioned particle sizes, structures that are too bulky and expensive in terms of costs, investment, management, energy and maintenance, should be used.

For example, polluting particulate filtering devices, such as for example bag filters or electrostatic filters, allow good performance, but introduce elements of structural complexity such that their use on a small scale is compromised. In particular, installation, maintenance and management costs are not acceptable for small-scale plants.

Some anti-particulate filtering systems according to the prior art, provide wet separators in which at least a portion of the plant, for example downstream or upstream of the water delivery nozzles, provides for demister or electrodes to increase the capture efficiency of the polluting particles.

Devices of the type indicated above are described, respectively, in patent n.MO2014A000037 and in the international patent application WO2015092149. The provision of further filtering elements, such as for example filling or internal condensation plates, upstream or downstream of the nozzles, requires in any case the increase of the separation chamber size.

In domestic applications, a reduction in size is required, determined by the size of the plant, and economic, determined by the costs of the structural components of the device and by the management and maintenance activity.

SUMMARY OF THE INVENTION

In light of the above, it is therefore an object of the present invention to propose a method and an apparatus for the separation of the fine particulate in gaseous suspension which overcome the drawbacks of the known art described above, and allow the capture of the polluting particles with a high efficiency.

Advantageously, the object according to the present invention is applicable in all the contexts in which there is a transport in the gaseous phase of fine solid particulate, and/or liquid particulate, with the aim of achieving a high level of separation efficiency and a low energy consumption.

A further advantage of the invention according to the present invention is the possibility of adjusting the parameters of the particulate filtration process, reducing the set-up times of the apparatus and optimizing the efficiency of the separation process.

A further advantage is the possibility of using an appropriate liquid for a possible chemical treatment of the gaseous stream.

Other advantages, features and methods of use of the present invention will be evident from the following detailed description of some embodiments, presented by way of a non-limiting example.

BRIEF DESCRIPTION OF THE FIGURES

Reference will be made to the figures of the attached drawings, wherein.

DETAILED DESCRIPTION OF PREFERRED EMBODIMENTS

Figure 1:
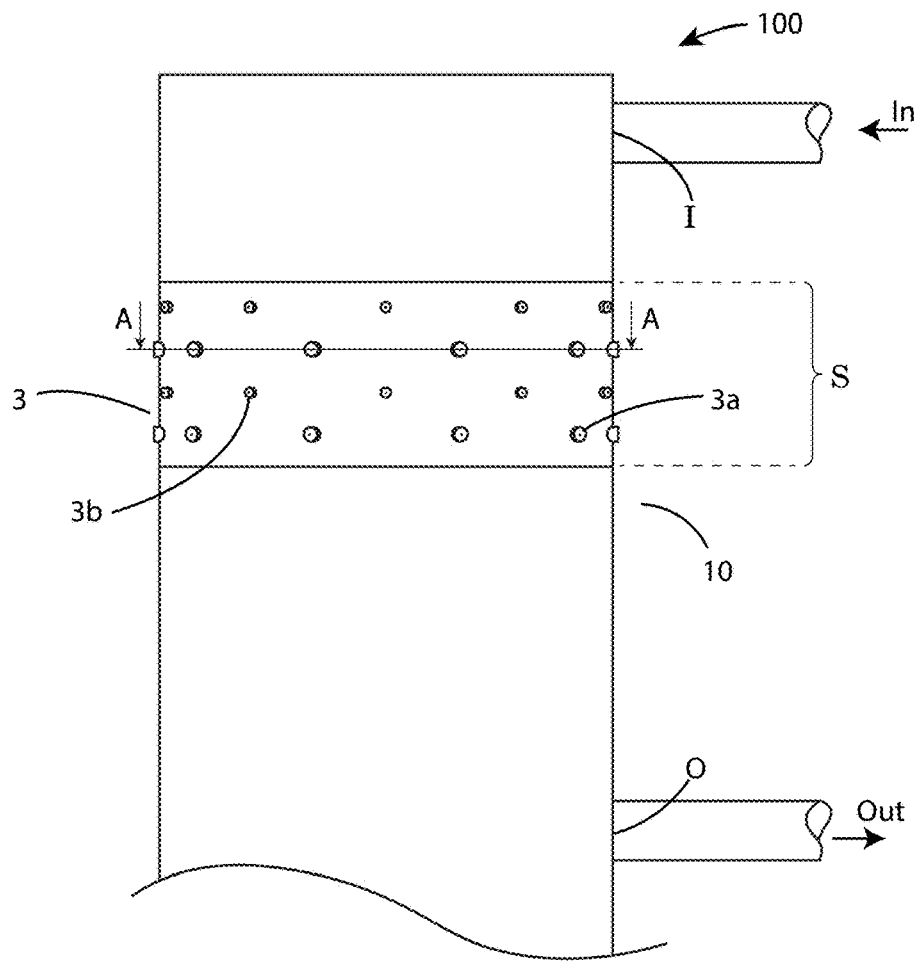
FIG. 1 shows a partial schematic view of an embodiment of the apparatus according to the present invention.
Figure 2:
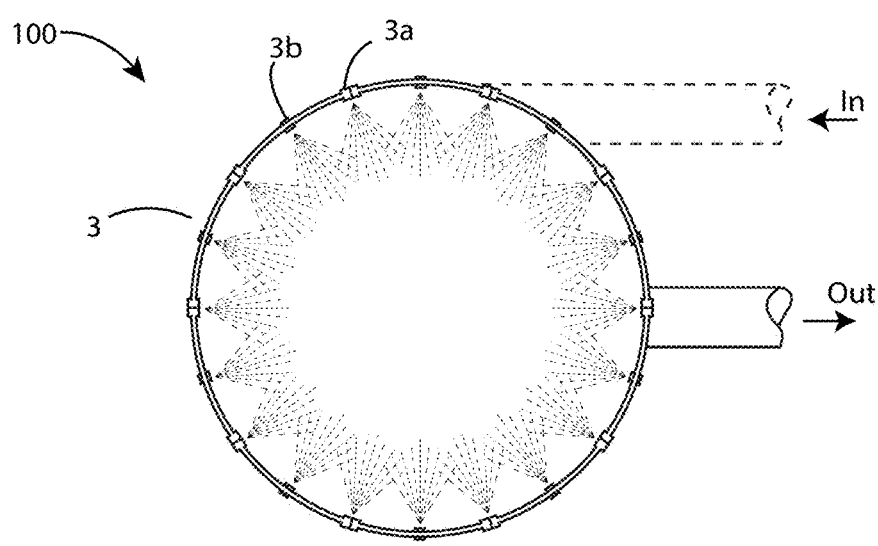
FIG. 2 shows a schematic view, in section A-A, of the apparatus in FIG. 1.

With reference to FIG. 1, an embodiment of the separation apparatus 100 according to the present invention comprises a washing chamber 10 for washing the exhaust gas, having an inlet mouth I for introducing the exhaust gases to be treated and an outlet mouth O for the expulsion of treated exhaust gases.

The washing chamber, in the example, is in particular substantially cylindrical shaped, for example having curved bottoms, but in different applications it may be of any other shape also in relation to the shape of the boiler.

As shown in the figures, the apparatus 100 comprises dispensing means 3 for dispensing the washing liquid.

In particular, the dispensing means comprises a plurality of delivery nozzles 3 positioned at a lateral surface portion of the washing chamber 10, identified as separation portion S.

In the example, the dispensing nozzles 3 deliver a liquid in a direction substantially orthogonal to the direction of the gas stream.

By means of different geometries, the liquid can be introduced in different directions with respect to the gas stream, such as to allow the encounter between particles suspended into the fumes and droplets introduced by the nozzles 3.

At a base portion of the apparatus 100, at least one collecting compartment is provided, not shown in the figure, to allow the collecting and removal of the dispensed washing liquid.

Preferably, the collecting compartment is positioned substantially at a base of the washing chamber 10 and the collected liquid is evacuated by the actuation of an interception valve, for example a ball or butterfly valve, with manual or automatic actuation.

The relative positioning of the inlet mouth I and of the outlet mouth O is such as to allow the formation of a gas flow, from an upper portion to a lower portion of the washing chamber 10, with a main flow direction substantially parallel to a direction of main extension of the chamber.

In particular, the gas flow is introduced into the washing chamber according to a direction substantially transverse to the main extension direction of the chamber.

The interaction of the injected gases with the cylindrical walls of the chamber determines a certain swirling of the flow which is therefore directed towards a lower portion of the washing chamber according to a non-linear path.

Advantageously, the whirling motion of the gases increases the path of the gases inside the washing chamber, allowing the phenomena of interaction of the washing liquid with the gas to be treated.

Preferably, the dispensing nozzles 3 are shaped in such a way as to deliver a pressurized liquid, shaped and designed as drops of known dimensions, into the chamber.

As shown in FIG. 1, the dispensing nozzles 3 are positioned equidistant from each other, so as to provide a delivery of the water drops in a direction substantially transverse to the flow of the gases and to allow an equal distribution of the drops into the washing chamber volume.

Preferably, the delivery nozzles 3 are positioned along a spiral path and the relative distance between consecutive nozzles is set so as to ensure a distribution between nozzles of different spires so as not to oppose the jets of the same nozzles. The nozzles positioned along longitudinally consecutive spires are then positioned offset from each other with respect to the direction of the fumes.

The spiral arrangement of the nozzles and the substantially swirling pattern of the gas flow allows an optimization in the interaction between particulate particles and drops of dispensed liquid, avoiding interference of drops coming from diametrically opposed nozzles.

In the present invention, the flows of water and gas are preferably cross-flow in a first phase, and in equicurrent in the second phase.

Therefore, the water initially flows in the horizontal plane in a radial direction and towards the center of the volume, to then proceed gradually, due to the gravity force, downwards in a substantially vertical direction.

The exhaust gas flow proceeds in a similar direction, allowing a contact between water and exhaust gas.

Preferably, the liquid used in the washing chamber 10 of the apparatus 100 according to the present invention is water.

The advantage of using water as a washing liquid is, in addition to limiting process costs, the fact that the separation processes as described below are promoted.

In an alternative embodiment, the use of chemical additives is provided, for example surfactant components which, by lowering the surface tension of the liquid, facilitate the contacting phenomenon with the particles present in the fumes.

By introducing these chemical additives, which increase the overall separation efficiency, it is possible to reduce the drop delivery pressure and/or obtain good separation results even when larger diameter delivery nozzles are used.

A reduction of the nozzles number and a saving in terms of water flow leads to a benefit in terms of energy consumed, which today is less than 10 Wh/Nm$^3$ of treated gas (value aligned with large-scale industrial applications).

To guarantee a high contacting efficiency, the dispensed drops must present at the origin an average dimension comparable with that of the powders to be captured, to then increase in size (after having incorporated the particle to be separated) in order to obtain an efficient separation, by means of encapsulation in the drop.

The diameter of the delivery nozzles 3 is then defined to allow the obtainment of drops of dispensed liquid having a diameter of between about 0.01-100 µm, so as to optimize the mechanisms of physical interaction in the contact between the drops and the particulate, as better described below.

In particular, to maximize the system efficiency, the nozzle diameter is defined to deliver drops with a diameter of approximately 8-10 µm, with low liquid flow and energy consumption values and therefore lower equipment management costs of separation.

Advantageously, the separation apparatus 100 according to the present invention further comprises means for adjusting the pressure of the dispensed liquid, in particular positioned between a water supply pump and the nozzles, so as to allow a pressure adjustment according to the specific exhaust gas to be purified, and according to the dimensions of the specific particulate to be separated.

In particular, once the size of the nozzles is defined, by adjusting the fluid supply pressure it is possible to adjust the flow rate on the single nozzle and therefore the size of the drops.

In fact, as the pressure increases, the flow of water increases and the size of the drops decreases.

To define the optimal size of the drops to be dispensed, and therefore to set the diameter of the dispensing nozzles, an analysis phase of the characteristics of the particulate contained in the exhaust gas can be provided.

In particular, a sample exhaust gas analysis step can be provided, for example at a plant start-up phase or at a predefined time interval, which advantageously allows the optimization of the pressure value of the dispensing nozzles.

Advantageously, the method according to the present invention further comprises an adjusting step for adjusting a drop concentration value per surface unit of the separation portion S of the washing chamber 10, or the so-called “degree of fullness”.

In particular, for a given section of the separation portion S, the degree of fullness represents the ratio between the elementary volume occupied by the drops with respect to the total geometric volume.

The degree of fullness is a function of at least two main factors: the flow of water per volume unit, directly correlated to the speed of crossing the drops, and the size of the drops.

In particular, the value of the water flow rate is determined by the number of nozzles positioned per lateral surface unit of the separation portion S, as well as by the supplying pressure of the nozzles.

Therefore, by increasing the number of nozzles, the flow rate of the dispensed liquid is increased.

Advantageously, the presence of adjusting diameter nozzles allows an optimization of the degree of fullness, for example through the delivery of variable diameter drops.

Advantageously, in addition to the size of the nozzles and the delivery pressure value, the dimensional affinity between liquid and particulate is influenced by the temperature of the gaseous fluid and by the flow rate and the nature of the dispensed liquid, which can be controlled in large plants through appropriate heat exchanges and relative measurement and control instruments, while in small plants the flow rate of the liquid is controlled, which is closely related to the size of the droplets as better detailed below.

In particular, the liquid used is the water of the boiler which is generally maintained, at an operating temperature of about 60° C.

The temperature of the dispensed liquid is lower than the temperature of the fumes, of a value of about 50-100° C.

Advantageously, in the object according to the present invention, the aforementioned temperature difference between the dispensed liquid and the gas flow is controlled in order to optimize the phenomena of evaporation, and/or condensation and/or coalescence, thus making the separation phenomena more effective.

Advantageously, this temperature difference allows, in the first phase of fumes cooling, an evaporation of the dispensed liquid, which in particular saturate the gaseous flow.

During the evaporation phase, the diameter of the dispensed drops is gradually reduced, until reaching a size comparable with that of the smallest particles to be treated.

In particular, the dispensed drops having an average size of about 8 μm, through the aforementioned evaporation step reach an average size of about 0.3 μm, that is dimensionally similar to the particles to be treated.

A few drops evaporate completely.

Therefore, an embodiment of the method according to the present invention provides a first contacting phase between drops and particulate due to a very high efficiency interception phenomenon, due to the dimensional affinity with the smallest particles reached by evaporation.

In a second phase, the further cooling of the saturated gases allow a condensation phenomenon of the drops. In particular, saturated gases return, by condensation, liquid to the surrounding environment, initially generating drops of submicronic dimensions that find their condensation core, preferably around particulate particles.

Finally, the coalescence between the water droplets performs the last growth that allows a facilitated separation from the gas stream.

As shown in FIG. 1, a preferred embodiment of the object according to the present invention, for applications having small dimensions, provides for an alternation of nozzles of different sizes.

Advantageously, through the aforementioned alternation, the degree of fullness is optimized in the separation portion S and the aforementioned evaporation, condensation and coalescence phenomena are therefore accelerated, through the creation of dispensed drops of different sizes.

In particular, following a path of the gas flow from the inlet mouth I to the outlet mouth O, a first section of the separation portion S comprises a plurality of delivery nozzles *3b* having a diameter D1. A second section, immediately following the first, in a direction of advancement of the gas flow, has a plurality of nozzles *3a* having a diameter D2 greater than the diameter D1. A third section, immediately following the second, has a plurality of nozzles *3b* having a diameter D3 smaller than the diameter D2.

A fourth section, immediately following the third, has a plurality of nozzles *3a* having a diameter D4 greater than D3.

In particular, in the first section crossed by the gas flow to be treated, a reduced size of the delivery diameter of the plurality of nozzles, combined with a large temperature difference between the injected gas and the dispensed liquid, results in a rapid evaporation of the liquid drops dispensed, thus activating a capture by interception of the particles.

In the second section, the simultaneous presence of dispensed drops of larger diameter and smaller diameter drops, generated in the aforementioned section, leads to an increase in the degree of fullness of the separation portion S.

In this section, the evaporation of liquid drops leads to rapid cooling and saturation of the gas flow. Therefore, in this section the impact capture of the coarse powders is favored (for example, having a diameter equal to or greater than about 10 μm).

In the third section, smaller diameter drops are dispensed.

Therefore, the degree of fullness is increased as the smaller droplets are better located into the available interstitial volume, favoring a maximum interception efficiency.

In the fourth section, the dispensed drops have a larger diameter than the diameter of the drops in the upper section. In this section the gas flow is quickly cooled and a condensation phase of the water contained in the gas flow is activated. Therefore, the process of intercepting the particulate continues with very small drops, no longer delivered by the nozzles but obtained by condensation.

Therefore, alternative embodiments of the apparatus according to the present invention have a plurality of separation portions S comprising nozzles with variable diameter or number of variable nozzles, so as to further optimize the efficiency of the phenomena described above.

The characterizing parameters of the object according to the present invention are furthermore adjusted to guarantee a residence time of the drops within the separation portion S sufficient to maximize the efficiency of separation of the particulate from the gas flow to be treated.

The residence time represents the time that the fine particles use to pass through the filtration zone in which the drops are delivered, also due to the condensation mechanisms that can occur even downstream of the volume occupied by the nozzles.

This value is a function of the flow rate of the gases to be treated, of the wet filtering section, and of the height of the filtering section.

An operative example of the apparatus 100 according to the present invention provides a separation portion S having a height of about 0.3 m and a section of about 0.04 m$^2$, in which a flow rate of the fumes is approximately equal to 40 Nm3/h.

In these operating conditions, the residence time is between 0.3 and 2 seconds, in particular it is equal to about 1 second.

As anticipated above, a preferred embodiment of the separation method according to the present invention provides for a step of introducing the flow of exhaust gas into the washing chamber 10, in which the gas has a flow direction substantially parallel to a longitudinal extension direction of the chamber 10.

Dispensing of a pressurized liquid, in particular water, in the form of drops in which at least one delivery direction is substantially transverse to the flow direction of the exhaust gases is provided into the washing chamber 10.

Advantageously, the physical interaction between liquid and particulate allows a separation of at least a portion of particulate particles from the exhaust gas.

As anticipated, the separation takes place through the contact and interaction between the particulate contained in the gas flow and the dispensed liquid, preferably atomised, coming out of appropriately positioned and sized nozzles, which capture the particulate according to the above mentioned mechanisms.

Advantageously, as anticipated, the object according to the present invention provides a pressure adjustment step, depending on the specific particulate to be separated so as to allow the above mentioned physical interaction between the liquid drops and the particulate particles during the separation operation.

The flow of filtered exhaust gas is then conveyed to the outside of the washing chamber, and the collecting liquid, which is deposited in a collecting base of the washing chamber, in particular due to gravitational falling, also following the condensation of the liquid of washing, is removed.

As anticipated, if the size of the drops decreases, all the separation mechanisms are favored because having smaller particles means favoring diffusion, having a higher interception parameter that improves the interception efficiency and greater impact.

Some examples of embodiments of the object according to the present invention are described below.

An exhaust gas stream and fumes generated by a 25 kW thermal biomass boiler, in particular a corn boiler, is considered. Before being directed towards an exit chimney, the gases are deviated to a second line where the separation apparatus according to the present invention is provided.

The gas flow rate leaving the boiler is 40 Nm$^3$/h, with an average powder concentration typically between 250 and 300 mg/Nm$^3$, and an average particle size around 0.3 µm.

The washing chamber must be suitably sized to ensure compliance with the optimal flow conditions for the separation process.

In particular, the cross section of the washing chamber has an internal diameter of about 220 mm to guarantee a gas crossing speed of less than 1 m/s, better if 0.5 m/s.

The maximum longitudinal dimension of the washing chamber is preferably around 300 mm so as to guarantee overall a residence of about 0.5 seconds of the gas inside the chamber.

Preferably, the total water flow rate inside the chamber 10 is about 3 l/min in such a way as to guarantee the formation of water drops with a diameter of an order of magnitude higher than that of the particles to be captured, in the specific case drops of diameter between 8 and 10 µm.

The water supplying nozzles have an outlet diameter of about 15 µm and are fed by a pump at a pressure of about 80 bar, so as to be able to generate the drops described above.

In particular, using nozzles characterized by a flow rate of about 0.05 l/min, to guarantee the above mentioned flow rate value, the chamber 10 has a number of at least 60 nozzles.

The value of the diameter of the nozzles, the number of nozzles and the pressure of the dispensed liquid are determined according to the size and quantity of the drops to be generated.

Advantageously, in the described embodiment, characterized by a flow rate of fumes of about 40 Nm3/h and an initial concentration of 250 mg/Nm3, it was possible to reduce the mass concentration of the particulate below 10 mg/Nm3.

Furthermore, an average separation efficiency of around 97% was achieved, with a value of load loss of less than 1 mbar and an energy consumption of less than 10 Wh/Nm$^3$.

The present invention has been described by way of illustration but not by way of limitation, according to its preferred embodiments, but it is to be understood that variations and/or modifications may be made by those skilled in the art without departing from the relative scope of protection, such as defined by the enclosed claims.

What is claimed is:

1. A method for separating solid and/or liquid particles from a gaseous stream, comprising the steps:
   introducing a gas stream inside a washing chamber, said gas being introduced into said washing chamber according to a direction substantially transversal with respect to a longitudinal direction along the extension of the chamber, said gas having a substantially swirling flow along said extension direction;
   delivering a drop shaped liquid inside the washing chamber by sequentially delivering, in a direction of advancement of the gas stream, first diameter drops, then second diameter drops larger than the first diameter drops, then third diameter drops smaller than second diameter drops, and finally fourth diameter drops larger than the third diameter drops, to allow a separation from the gas flowing of at least a portion of particulate particles located into the gas stream, by incorporation into the drop through a physical contact between the liquid drop and the particulate, in a solid or liquid form;
   conveying the gas stream towards the outside of the washing chamber; and
   removing a liquid, comprising the separated particles, collected in a lower portion of said washing chamber, said collected liquid being collected by gravitational motion or by condensation of the washing liquid after said separating step,
   wherein said delivering step occurs by making the delivered liquid to a preset pressure value, said preset pressure value being a function of a dimensional value of the particulate to be separated, so as to allow, during said separating step, a physical interaction between the delivered liquid drops and the particulate particles, wherein an evaporation step of said drops is provided, allowing a reduction in the average diameter of the drops, and wherein a condensation step of said drops is provided, said condensation occurring around the particulate particles.

2. The method according to claim 1, comprising an adjusting step for adjusting a delivering diameter of nozzles.

3. The method according to claim 1, comprising an adjusting step for adjusting delivering pressure.

4. The method according to claim 1, wherein a residence time of the gas stream inside the washing chamber is comprised in a time range of 0.3-2 seconds.

5. The method according to claim 1, wherein a temperature gap between the delivered liquid and the gas stream is monitored to allow the evaporation, and/or condensation and/or coalescence phenomena, in order to make the separation more effective.

\* \* \* \* \*